US009402111B2

(12) United States Patent
Muller et al.

(10) Patent No.: US 9,402,111 B2
(45) Date of Patent: Jul. 26, 2016

(54) TELEVISION AUDIENCE MEASUREMENT METHOD AND APPARATUS

(71) Applicant: ISPOT.TV, INC., Bellevue, WA (US)

(72) Inventors: Sean Muller, Bellevue, WA (US); Scott Happell, Redmond, WA (US); Ewan Godley, Renton, WA (US)

(73) Assignee: ISPOT.TV, INC., Bellevue, WA (US)

( * ) Notice: Subject to any disclaimer, the term of this patent is extended or adjusted under 35 U.S.C. 154(b) by 0 days.

(21) Appl. No.: 14/489,359

(22) Filed: Sep. 17, 2014

(65) Prior Publication Data

US 2016/0080789 A1 Mar. 17, 2016

(51) Int. Cl.
H04N 21/81 (2011.01)
H04N 21/44 (2011.01)
H04N 21/442 (2011.01)
H04N 21/658 (2011.01)
H04N 21/258 (2011.01)

(52) U.S. Cl.
CPC ....... *H04N 21/812* (2013.01); *H04N 21/25841* (2013.01); *H04N 21/25883* (2013.01); *H04N 21/25891* (2013.01); *H04N 21/44008* (2013.01); *H04N 21/44222* (2013.01); *H04N 21/6582* (2013.01)

(58) Field of Classification Search
CPC .................................................... H04N 21/812
See application file for complete search history.

(56) References Cited

U.S. PATENT DOCUMENTS

2007/0250856 A1* 10/2007 Leavens ................. H04H 60/48 725/36
2008/0183757 A1* 7/2008 Dorogusker ....... G06Q 30/0241
2013/0227601 A1 8/2013 Zigmond et al.
2013/0305273 A1 11/2013 Hadfield et al.
2013/0339991 A1 12/2013 Ricci
2014/0032321 A1 1/2014 Krafcik et al.
2014/0115615 A1 4/2014 Fuhrer
2014/0157299 A1* 6/2014 Alcala .............. H04N 21/44222 725/14
2015/0195608 A1* 7/2015 Kang ................. H04N 21/4316 725/18

OTHER PUBLICATIONS

"TAM Glossary Alphabetical View" The Nielsen Company, captured Oct. 22, 2008, at https://web.archive.org/web/20081022090540/ http://www.agbnielsen.net/glossary/glossaryQ.asp? and "TAM Glossary" The Nielsen Company, captured Oct. 13, 2008, at https:// web.archive.org/web/20081013190329/http://www.agbnielsen.net/ glossary/glossary.asp.*

\* cited by examiner

*Primary Examiner* — Benjamin R Bruckart
*Assistant Examiner* — Krista A Contino Saumby
(74) *Attorney, Agent, or Firm* — Schwabe, Williamson & Wyatt, P.C.

(57) ABSTRACT

Television transmissions are received at multiple locations across a large area. Advertisements are identified, harvested and tagged from within in the television transmissions. The advertisements are made into smaller representations ("fingerprinted") and are assigned identifiers and media plans are determined for the advertisements. Smart TVs use the advertisement representations to identify advertisements in television content received by the smart TVs. The smart TVs report the advertisement identifiers and identifiers of shows in the television content received by the smart TVs. The television content and advertisements as rendered by the smart TVs are categorized as live, timeshifted, on-demand, over-the-top, and the like. The advertisements are categorized as occurring in national or regional ad slots. The data from the smart TVs is used to determine ad impressions, gross rating points, and target rating points.

16 Claims, 13 Drawing Sheets

TELEVISION AUDIENCE MEASUREMENT METHOD AND APPARATUS

FIELD

This disclosure relates to a method and system for measuring the audience size of television commercials.

BACKGROUND

The following description includes information that may be useful in understanding the present invention. It is not an admission that any of the information provided herein is prior art or relevant to the presently claimed invention, or that any publication specifically or implicitly referenced is prior art.

Television audience measurement technologies use human-completed paper logs, somewhat automated "People Meters", and, more recently, more automated "Portable People Meters" and analysis of "Set-Top Box" data. Paper logs are notebooks in which research subjects record what television broadcast channels and shows they watch and at what time. The paper logs are criticized for being imprecise or inaccurate, for under-reporting daytime and late-night viewing, for failing to record channel "surfing" (rapidly changing channels), and for only measuring audience behavior during relatively few periods during the year. People Meters have buttons, generally one for each research subject in a residence. The research subject presses a button to indicate that they are watching the television and the People Meter records what frequency the television is tuned to. By cross-referencing the time of day with a broadcast schedule for the channel utilizing the frequency, it is possible to determine the program which the research subject was probably watching (assuming there were no deviations from the schedule).

People Meters also allow non-research subjects to input their age and other demographic information (via buttons), so that non-research subjects may also provide information. Paper logs and People Meters are criticized for requiring active engagement by the research subject, for the selection and distribution of research subjects across the population, for only being used inside of residences, for not measuring audience behavior with respect to non-traditional media rendering devices (smart phones, tables, laptop and desktop computers, and the like), and for the inexact connection between program schedule and what programs and advertisements were actually viewed. Portable People Meters ("PPM") are devices worn on or carried by a research subject. The PPM detects inaudible information encoded in the airchain and transmits the decoded information to the research organization. The decoded information identifies the media which the research subject was exposed to.

Set-Top Box data from cable converter boxes and the like has been used more recently to measure audience sizes and characteristics. Set-Top Boxes have a large installed base, the data is easily accessible and there is readily available demographic data at the household level. However, one of the major weaknesses in Set-Top Box data is the inability to verify whether the television screen is actually on and whether the content is being viewed since many people turn off their televisions without turning off the Set-Top Box. This leaves measurement companies guessing and creating algorithms to guess what was actually viewed. The second issue with Set-top Box data is not knowing definitively what advertisements ran during a program and requires matching of external "as-run ad logs" to determine what ads may have been viewed. This is further complicated by certain advertisement types that are locally inserted, operator inserted, dynamically inserted, or inserted into an "over-the-top" program transmission (program transmission on Netflix, Hulu, and the like is referred to herein as an "over-the-top" or "OTT" transmission). The tracking of advertisements in on-demand programming, OTT programming, and other types of advertisements is virtually impossible via Set-Top Box data.

Existing audience measuring systems are very dependent on the accuracy of a media plan, which is used to determine what the research subject was exposed to. Furthermore, existing audience measuring systems are slow, do not record many forums and devices in which and by which media is rendered, and are oriented around shows and show audiences, rather than advertisements and advertisement audiences.

Needed is a system and method to accurately measure and verify the exposure and make-up of audiences of television advertisements, whether the advertisements are in linear television, on-demand, OTT, or played via the Internet (e.g. via Chromecast or the like).

DETAILED DESCRIPTION

Figure 1:
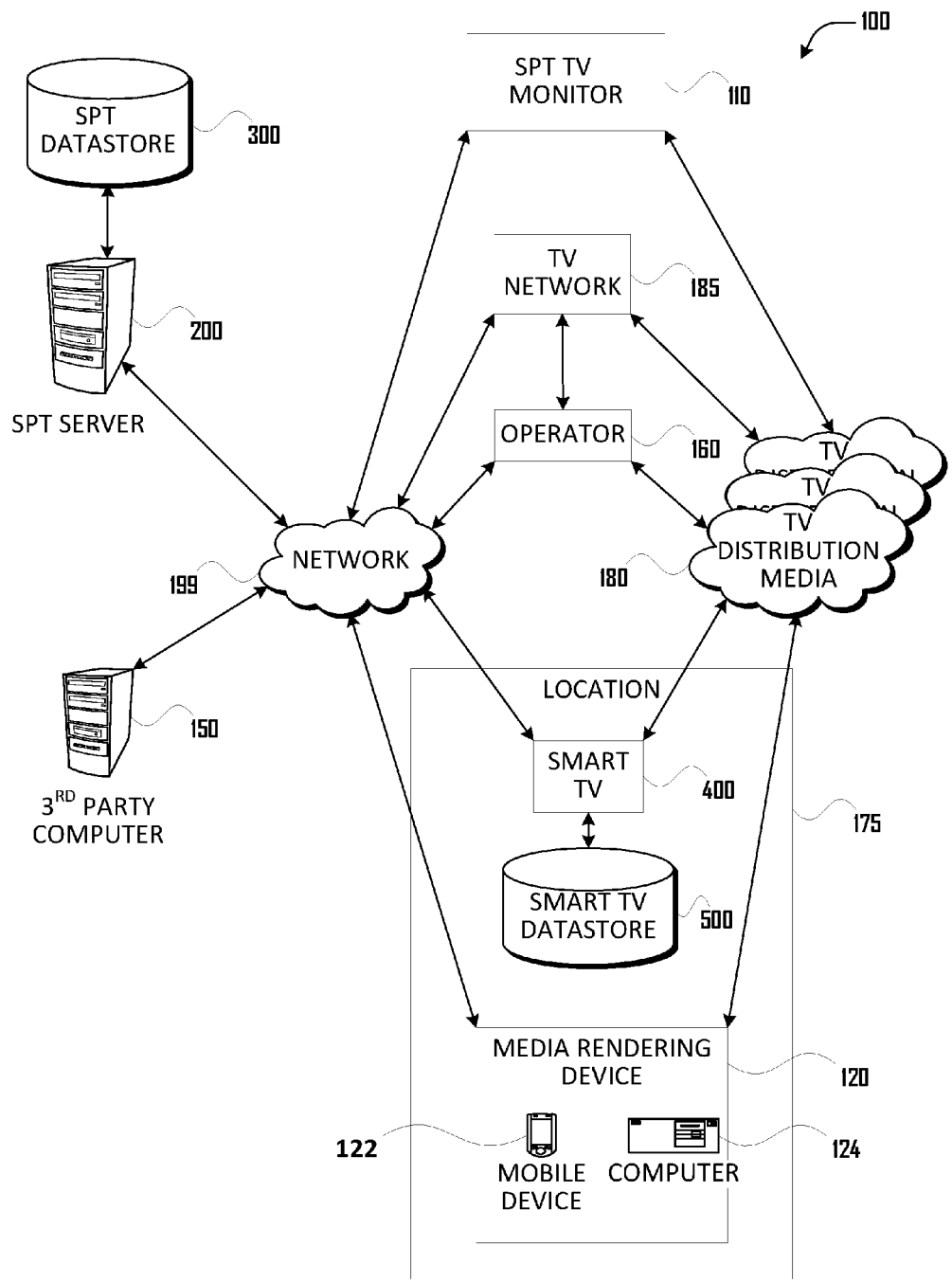
FIG. 1 is a network and device diagram illustrating exemplary computing devices configured according to embodiments disclosed in this paper.

The following Detailed Description provides specific details for an understanding of various examples of the technology. One skilled in the art will understand that the technology may be practiced without many of these details. In some instances, structures and functions have not been shown or described in detail or at all to avoid unnecessarily obscuring the description of the examples of the technology. It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect between two or more elements; the coupling of connection between the elements can be physical, logical, or a combination thereof. Additionally, the words, "herein," "above," "below," and words of similar import, when used in this application, shall refer to this application as a whole and not to particular portions of this application. When the context permits, words using the singular may also include the plural while words using the plural may also include the singular. The word "or," in reference to a list of two or more items, covers all of the following interpretations of the word: any of the items in the list, all of the items in the list, and any combination of one or more of the items in the list.

Multiple instances of certain components are labeled with an element number and letter; all such component instances are equivalent within normal ranges. Multiple instances of otherwise identical components can control, be controlled, or communicate separately through assignment of unique or distinguishing identifiers. Such components may be referred to herein only by element number, without a letter in conjunction therewith, in which case the reference is to any of such components.

As used herein, "TV" is an abbreviation for "television".

As used herein, "on-demand programming" means audio and/or video content which a user selects; the on-demand programming is typically selected and viewed in real-time, though the programming may also be downloaded or otherwise recorded (by a computing device proximate to the end user or at a server remote from the end user) for later viewing or rendering.

As used herein, "linear television" means television programming which is broadcast on a pre-established schedule to a large audience.

As used herein, "Smart TV" is a television or set-top box with an integrated computer and Internet services. Smart TVs can access and render broadcast television programming as well as online interactive media, Internet TV, OTT content, and network-accessible content, typically through a downloaded or pre-installed software application or "app". Smart TVs are computers comprising a memory, an operating system, and applications for receiving and rendering broadcast television programming and content obtained through apps.

As used herein, "Operator" is an organization which provides content via TV Distribution Media. Operators may aggregate content from multiple Television Networks, each of which may be assigned a "channel" or equivalent in the Broadcast Media.

As used herein, "TV Distribution Media" is a one-to-many communication medium which generally utilizes electromagnetic radiation to transmit information; examples of TV Distribution Media include radio and television terrestrial broadcast media, satellite broadcast media, and cable systems.

As used herein, "TV Network" is a distributor of linear television content, generally allocated one or more "channels" in TV Distribution Media. TV Networks commonly, though not exclusively, distribute linear television content through Operators, such as through a cable company. TV Networks may distribute linear television content directly through certain types of TV Distribution Media, such as through terrestrial broadcast media.

As used herein, "Pod" means a cluster of consecutive commercials or spot announcements within a television show.

As used herein, "Ad Slot" means a portion of a Pod in which an advertisement may be inserted. A Pod generally comprises multiple Ad Slots.

FIG. 1 is a network and device diagram illustrating exemplary computing devices configured according to embodiments disclosed in this paper. Illustrated is SPT Server 200 computer, which SPT Server 200 connects to Smart TV 400 and Media Rendering Device 120 via network 199.

Smart TV 400 and Media Rendering Device 120 are illustrated within Location 175. Location 175 may be, for example, a house, an apartment building, or the like. Smart TV 400 and Media Rendering Device 120 do not have to be collocated (as illustrated in FIG. 1, within Location 175), but may be located in different locations. SPT Server 200 may comprise or be connected to SPT Datastore 300 (discussed further below). Illustrated within Media Rendering Device 120 are examples of Media Rendering Device 120, such as Computer 124 (which may be a laptop, desktop, tower computer and similar) and Mobile Device 122 (which may be a smart phone, mobile phone, tablet computer, wearable computer, and similar). Media Rendering Device 120 illustrates computers and/or equipment which users may utilize to render television and other content obtained from TV Distribution Media 180 and from Network 199. Media Rendering Device 120 also interacts with the SPT Server 200 (as described further herein).

Also illustrated in FIG. 1 is Smart TV 400 and Smart TV Datastore 500, discussed further below.

Also illustrated in FIG. 1 are Operator 160, TV Network 185, and TV Distribution Media 180. These terms are defined above.

Also illustrated in FIG. 1 is SPT TV Monitor 110. SPT TV Monitor 110 connects to TV Distribution Media 180 across a wide geographic area, analyses linear television content distributed on TV Distribution Media 180, and transmits information to SPT Server 200. SPT TV Monitor 110 may perform some or all of the routines attributed to SPT Server 200; for example, some or all of Ad Harvester 600 routine may be performed by SPT TV Monitor 110.

Also illustrated in FIG. 1 is $3^{rd}$ Party Computer 150. $3^{rd}$ Party Computer 150 represents multiple parties, corporations, and the like who may be sources of information, such as program schedules for linear television distributed on TV Distribution Media 180, census data, and the like.

Network 199 illustrated in FIG. 1 comprises computers, network connections among the computers, and software routines to enable communication between the computers over the network connections. Examples of the Network 199 comprise an Ethernet network, the Internet, and/or a wireless network, such as a GSM, TDMA, CDMA, EDGE, HSPA, LTE, LTE-Advanced or other network provided by a wireless service provider. Connection to the Network 199 may be via a wireless or wireline connection. More than one network may be involved in a communication session between the illustrated devices. Connection to the Network 199 may require that the computers execute software routines which enable, for example, the seven layers of the OSI model of computer networking or equivalent in a wireless phone network.

This paper may discuss a first computer or computer process as connecting to a second computer or computer process (such as the Smart TV 400 connecting to the SPT Server 200) or to a corresponding datastore (such as to SPT Datastore 300); it should be understood that such connections may be to, through, or via the other of the two components (for example, a statement that Smart TV 400 connects with or sends data to the SPT Server 200 should be understood as saying that the computing device may connect with or send data to the SPT Datastore 300). References herein to "database" should be understood as equivalent to "Datastore." Although illustrated as components integrated in one physical unit, the computers and databases may be provided by common (or separate) physical hardware and common (or separate) logic processors and memory components. Though discussed as occurring within one computing device, the software routines and data groups used by the software routines may be stored and/or executed remotely relative to any of the computers through, for example, application virtualization.

In overview (described in greater detail, below), SPT Server 200 executes Ad Harvester 600 routine (potentially in conjunction with or using SPT TV Monitor 110) to identify advertisements in linear television and to save information regarding the advertisements.

SPT Server 200 also executes Media Plan Determiner 700 routine to determine a media plan for advertisements based on data from Ad Harvester 600 routine, and, with data from SPT TV Monitor 110, to categorize Ad Slots and Advertisements in television shows as "national", "regional", "local" and/or "dynamically inserted".

In overview, Smart TV 400 (defined above) is owned or possessed by a television viewer. Smart TV 400 executes Viewing Data Collector 800 to collect information regarding Smart TV 400, itself, as well as regarding linear television transmitted via TV Distribution Media 180. The information collected by Smart TV 400 regarding the Smart TV 400, itself, comprises identifiers of the Smart TV 400 and of an IP Address or the like assigned to Smart TV 400 and the Designated Market Area ("DMA") in which the Smart TV 400 is located. The information collected by Smart TV 400 regarding linear television transmitted via TV Distribution Media 180 comprises a channel which Smart TV 400 received and rendered, a network call sign which may be associated with the channel, a show identifier of a show rendered by Smart TV 400 on the channel, and an SPT Ad ID of an advertisement in the show rendered by Smart TV 400.

In overview, SPT Server 200 also executes Smart TV Data Collector 900 to collect data from Viewing Data Collector 800, to execute Ad Insertion Type Determiner 1000, to determine the number of advertisement impressions which occur in the advertisement insertion type categories determined by Ad Insertion Type Determiner 1000, and to determine the GRP and TRP for advertisements. Ad Insertion Type Determiner 1000 categorizes content rendered by Smart TV 400 as being live or time shifted, categorizes non-national advertisement insertions as being regional or dynamic, and categorizes programming sources as being on-demand, OTT, or Internet.

Figure 2:
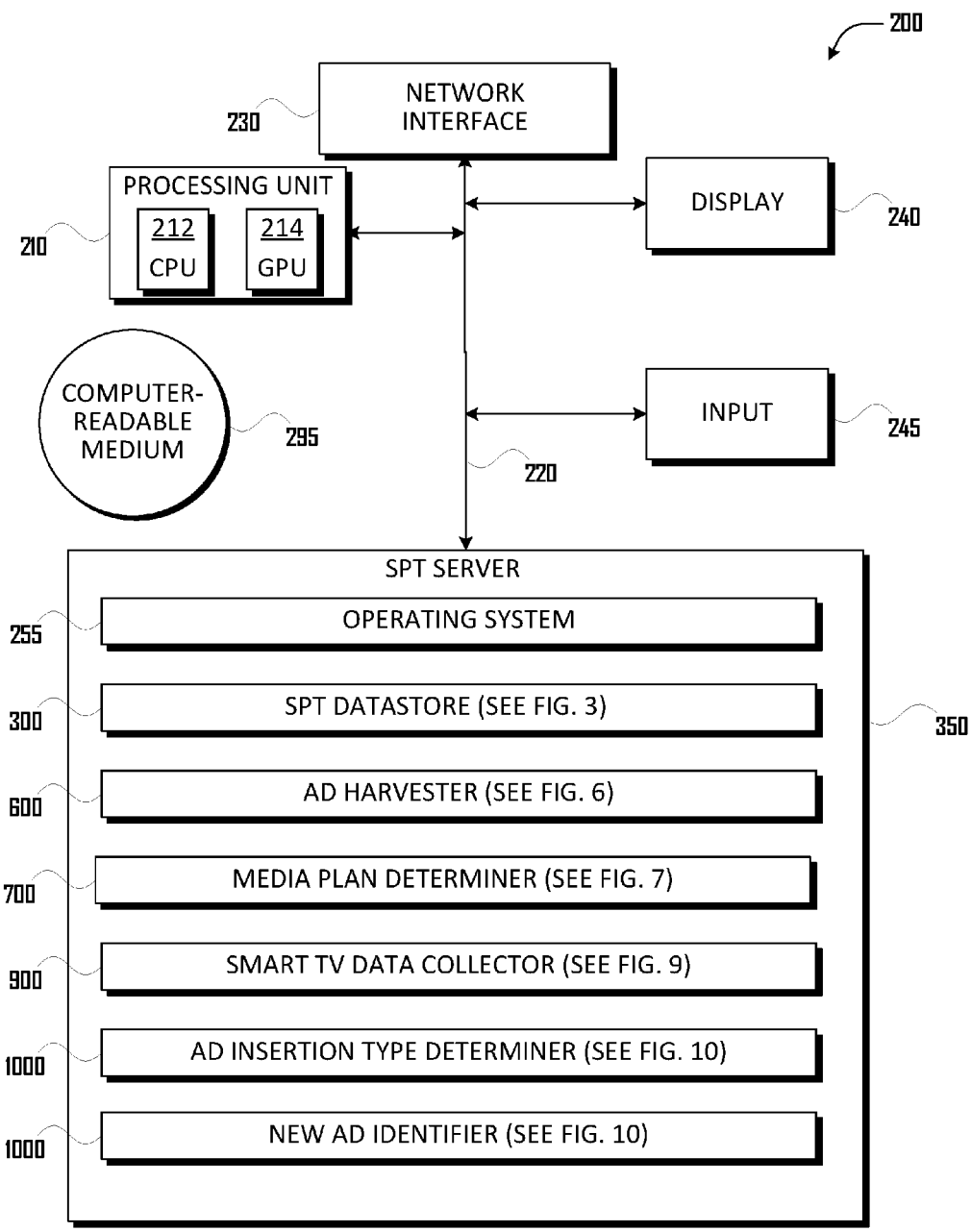
FIG. 2 is a functional block diagram of an exemplary SPT Server computing device and some data structures and/or components thereof.

FIG. 2 is a functional block diagram of an exemplary SPT Server 200 computing device and some data structures and/or components thereof. SPT Server 200 comprises at least one Processing Unit 210, SPT Server Memory 250, Display 240 and Input 245, all interconnected along with Network Interface 230 via Bus 220. Processing Unit 210 may comprise one or more general-purpose Central Processing Units ("CPU") 212 as well as one or more special-purpose Graphics Processing Units ("GPU") 214.

The components of Processing Unit 210 may be utilized by Operating System 255 for different functions required by routines executed by SPT Server 200. Network Interface 230 may be utilized to form connections with Network 199 or to form device-to-device connections with other computers. SPT Server Memory 250 generally comprises a random access memory ("RAM"), a read only memory ("ROM"), and a permanent mass storage device, such as a disk drive or SDRAM (synchronous dynamic random-access memory).

SPT Server Memory 250 stores program code for software routines, such as, for example, Ad Harvester 600, Media Plan Determiner 700, Smart TV Data Collector 900, Ad Insertion Type Determiner 1000, as well as, for example, browser, email client and server routines, client applications, and database applications (discussed further below). Additional data groups for routines, such as for a webserver and web browser, may also be present on and executed by the SPT Server 200. Webserver and browser routines may provide an interface for interacting with the other computing devices illustrated in FIG. 1 or with other computing devices not illustrated in FIG. 1, for example, through webserver and web browser routines (which may serve and respond to data and information in the form of webpages and html documents or files). The browsers and webservers are meant to illustrate user- and machine-interface routines generally, and may be replaced by equivalent routines for serving and rendering information to and in an interface in a computing device (whether in a web browser or in, for example, a mobile device application, or an API call to a server, a library, or the like).

In addition, SPT Server Memory 250 also stores Operating System 255. These software components may be loaded from a non-transient Computer Readable Storage Medium 295 into SPT Server Memory 250 of the computing device using a drive mechanism (not shown) associated with a non-transient Computer Readable Storage Medium 295, such as a floppy disc, tape, DVD/CD-ROM drive, memory card, or other like storage medium. In some embodiments, software components may also or instead be loaded via a mechanism other than a drive mechanism and Computer Readable Storage Medium 295 (e.g., via Network Interface 230).

The SPT Server 200 may also comprise hardware supporting input modalities, Input 245, such as, for example, a touchscreen, a camera, a keyboard, a mouse, a trackball, a stylus, motion detectors, and a microphone. Input 245 may also serve as Display 240, as in the case of a touchscreen display which also serves as Input 245, and which may respond to input in the form of contact by a finger or stylus with the surface of Input 245. Input 245 and Display 240 may physically be part of SPT Server 200 and/or may be a component(s) of another device, such as of Imager-Sorter 100.

Figure 3:
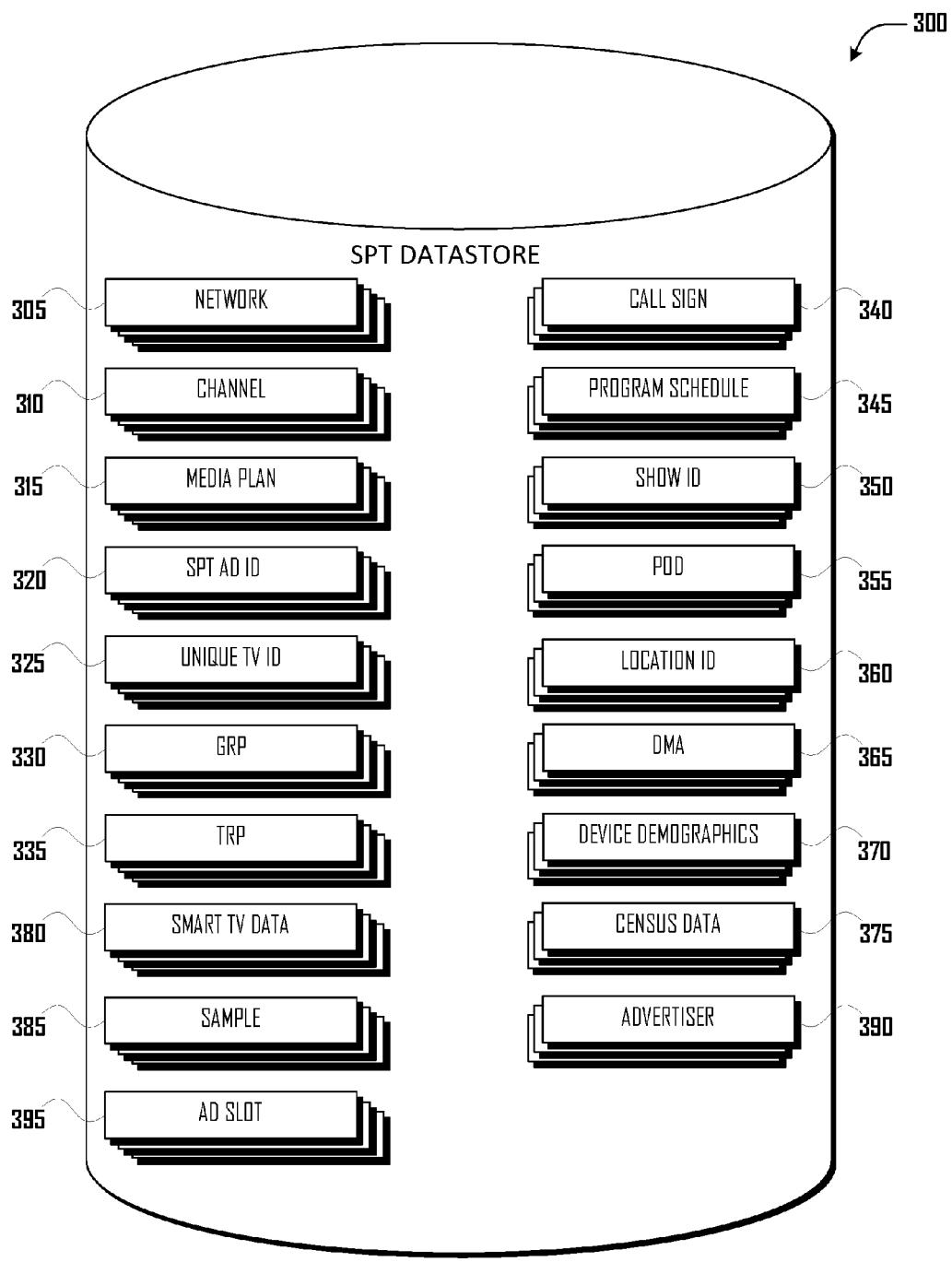
FIG. 3 is a functional block diagram of an exemplary SPT Server Datastore.

The SPT Server 200 may also comprise or communicate via Bus 220 with SPT Datastore 300, illustrated further in FIG. 3. In various embodiments, Bus 220 may comprise a storage area network ("SAN"), a high speed serial bus, and/or via other suitable communication technology. In some embodiments, the SPT Server 200 may communicate with the SPT Datastore 300 via Network Interface 230. The SPT Server 200 may, in some embodiments, include many more components than those shown in this Figure. However, it is not necessary that all of these generally conventional components be shown in order to disclose an illustrative embodiment.

FIG. 3 is a functional block diagram of an exemplary SPT Server Datastore 300. The illustrated components of the SPT Datastore 300 are data groups used by routines and are discussed further herein in the discussion of other of the Figures.

The data groups used by routines illustrated in FIG. 3 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, joins, conditional logic, tests, and similar.

Figure 4:
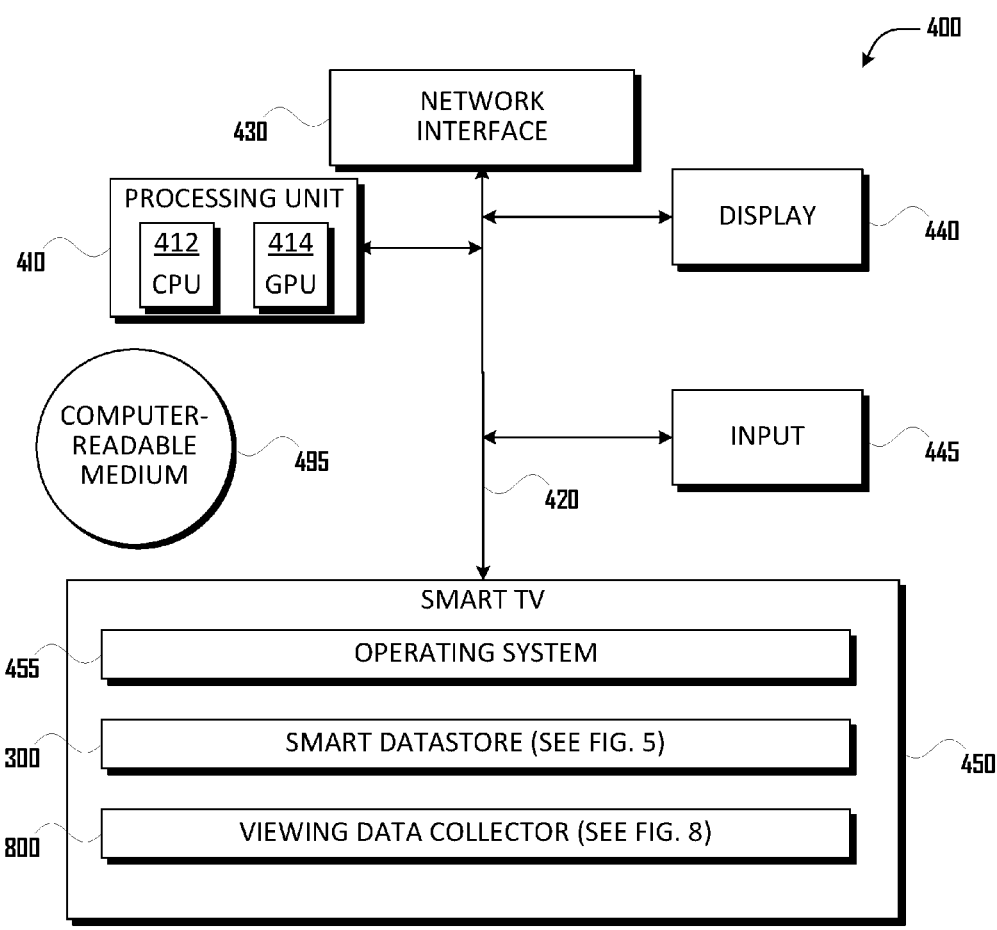
FIG. 4 is a functional block diagram of an exemplary Smart TV computing device and some data structures and/or components thereof.

FIG. 4 is a functional block diagram of an exemplary Smart TV 400 computing device and some data structures and/or components thereof. Smart TV 400 comprises at least one Processing Unit 410, Smart TV Memory 450, Display 440 and Input 445, all interconnected along with Network Interface 430 via Bus 420. Processing Unit 410 may comprise one or more general-purpose Central Processing Units ("CPU") 412 as well as one or more special-purpose Graphics Processing Units ("GPU") 414.

The components of Processing Unit 410 may be utilized by Operating System 455 for different functions required by routines executed by Smart TV 400. Network Interface 430 may be utilized to form connections with Network 199 or to form device-to-device connections with other computers. Smart TV Memory 450 generally comprises a random access memory ("RAM"), a read only memory ("ROM"), and a permanent mass storage device, such as a disk drive or SDRAM (synchronous dynamic random-access memory). Smart TV Memory 450 stores program code for software routines, such as, for example, Viewing Data Collector 800, as well as, for example, browser, email client and server routines, client applications, and database applications (discussed further below). Additional data groups for routines, such as for a webserver and web browser, may also be present on and executed by the Smart TV 400. Webserver and browser routines may provide an interface for interacting with the other computing devices illustrated in FIG. 1 or with other computing devices not illustrated in FIG. 1, for example, through webserver and web browser routines (which may serve and respond to data and information in the form of webpages and html documents or files). The browsers and webservers are meant to illustrate user- and machine-interface routines generally, and may be replaced by equivalent routines for serving and rendering information to and in an interface in a computing device (whether in a web browser or in, for example, a mobile device application, or an API call to a server, a library, or the like).

In addition, Smart TV Memory 450 also stores Operating System 455. These software components may be loaded from a non-transient Computer Readable Storage Medium 495 into Smart TV Memory 450 of the computing device using a drive mechanism (not shown) associated with a non-transient Computer Readable Storage Medium 495, such as a floppy disc, tape, DVD/CD-ROM drive, memory card, or other like storage medium. In some embodiments, software components may also or instead be loaded via a mechanism other than a drive mechanism and Computer Readable Storage Medium 495 (e.g., via Network Interface 430).

The Smart TV 400 may also comprise hardware supporting input modalities, Input 245, such as, for example, a touchscreen, a camera, a keyboard, a mouse, a trackball, a stylus, motion detectors, and a microphone. Input 445 may also serve as Display 440, as in the case of a touchscreen display which also serves as Input 445, and which may respond to input in the form of contact by a finger or stylus with the surface of Input 445. Input 445 and Display 440 may physically be part of Smart TV 400 and/or may be a component(s) of another device.

Figure 5:
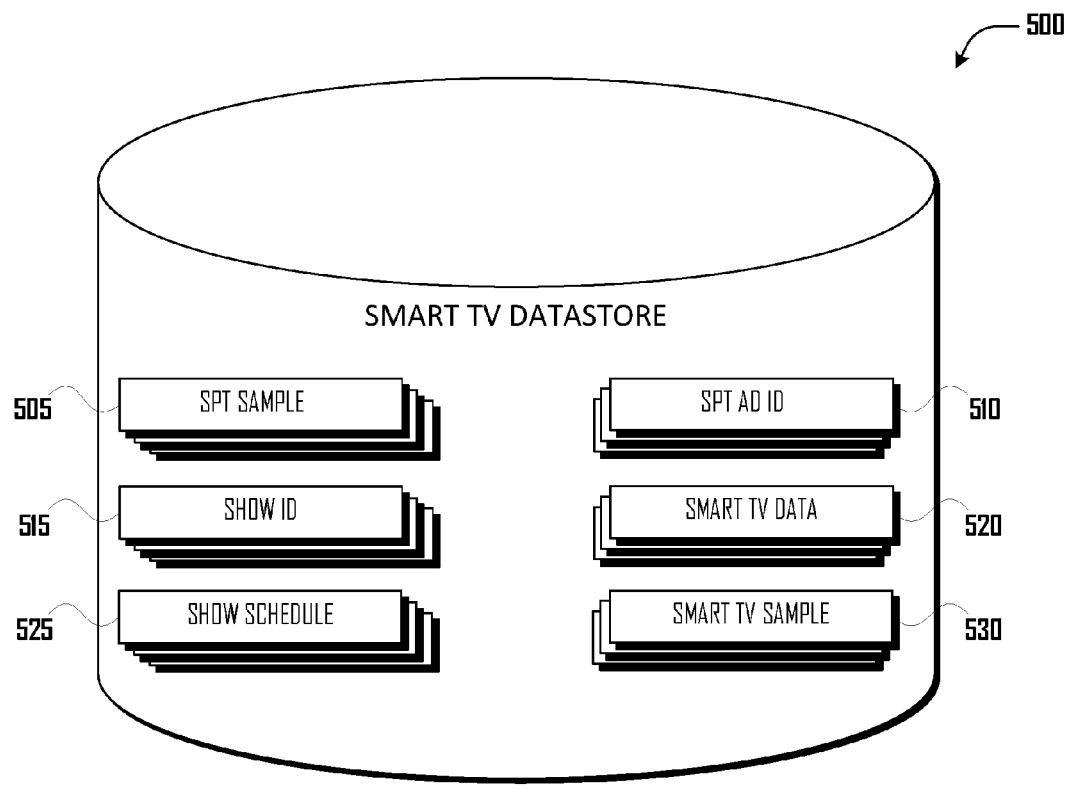
FIG. 5 is a functional block diagram of an exemplary Smart TV Datastore.

Smart TV 400 may also comprise or communicate via Bus 420 with Smart TV Datastore 500, illustrated further in FIG. 5. In various embodiments, Bus 420 may comprise a storage area network ("SAN"), a high speed serial bus, and/or via other suitable communication technology. In some embodiments, the Smart TV 400 may communicate with the Smart TV Datastore 500 via Network Interface 430. Smart TV 400 may, in some embodiments, include many more components than those shown in this Figure. However, it is not necessary that all of these generally conventional components be shown in order to disclose an illustrative embodiment.

FIG. 5 is a functional block diagram of an exemplary Smart TV Datastore 500. The illustrated components of the Smart TV Datastore 500 are data groups used by routines and are discussed further herein in the discussion of other of the Figures.

The data groups used by routines illustrated in FIG. 5 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, joins, conditional logic, tests, and similar.

Figure 6:
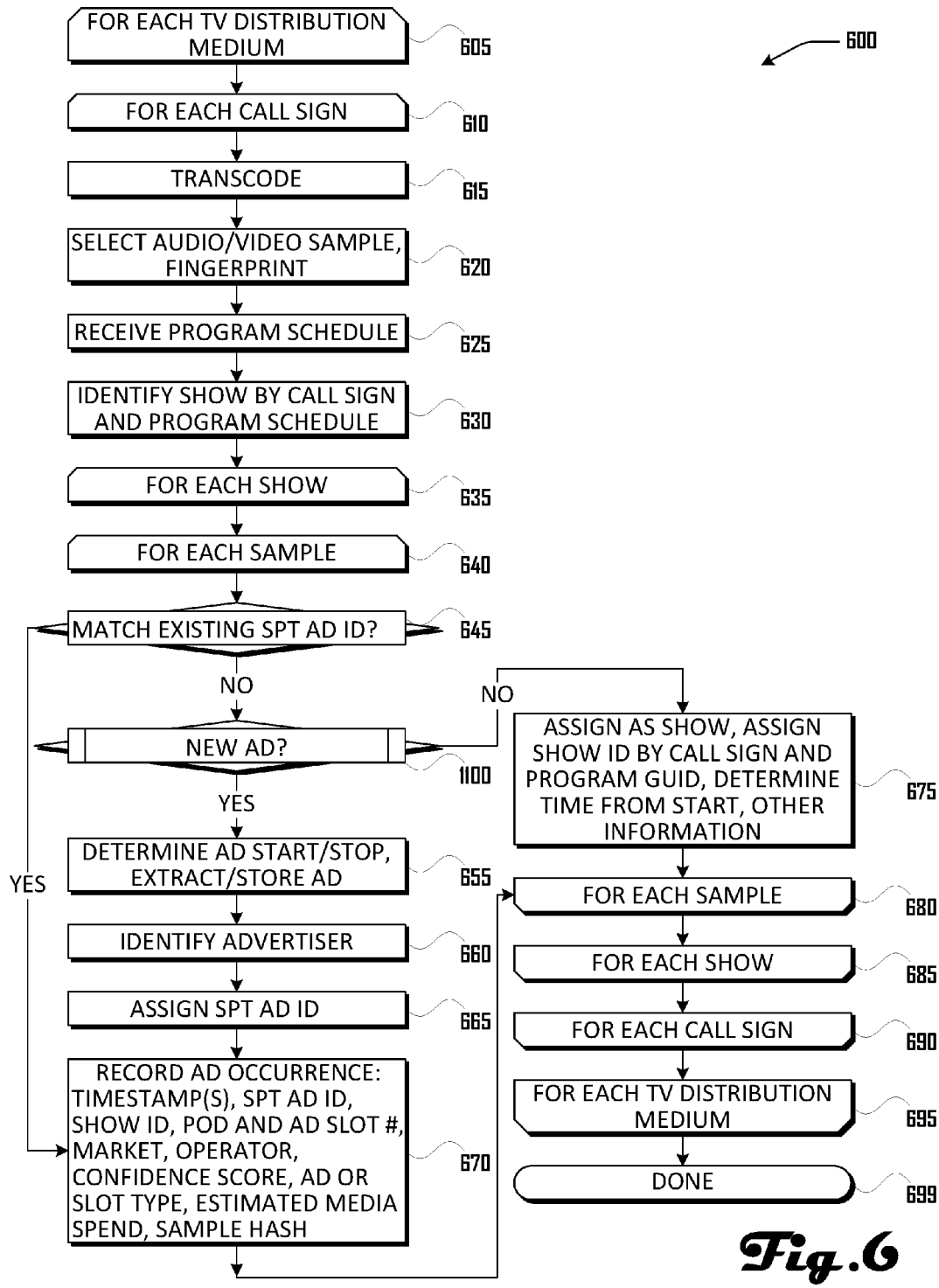
FIG. 6 is a flowchart illustrating an exemplary embodiment of an Ad Harvester routine.

FIG. 6 is a flowchart illustrating an exemplary embodiment of an Ad Harvester 600 routine. Ad Harvester 600 may be executed by SPT Server 200 and/or by SPT TV Monitor 110. Multiple television signal receivers may be present in such devices and such devices or signal receivers thereof may be distributed across a large geographic area, such as in multiple cities, in multiple states, and the like, connecting to multiple different TV Distribution Media 180 to obtain linear television from many sources and to execute Ad Harvester 600 with respect to the multiple linear television sources.

Blocks 605 to 695 iterate over each TV Distribution Medium 180 to which the computer hardware executing the Ad Harvester 600 routine can connect. Blocks 610 to 690 iterate over each "channel" which the computer hardware executing the Ad Harvester 600 routine can receive. "Channels" are commonly understood as dividing the communication spectrum used by TV Distribution Medium 180, though "channels" are now often a logical division, not a physical or electro-magnetic division of spectrum. For this reason, blocks 610 to 690 are labeled in relation to a "call sign" for each "channel". "Call signs" are commonly assigned to "channels"; examples of "call signs" include NBC, ABC, CNN and the like. Call signs may be recorded in SPT Datastore 300 as Call Sign 340 records.

At block 615, the linear television received via the then-current Call Sign 340 may encoded and/or transcoded from the source signal (which may be analog or digital) obtained from the TV Distribution Medium 180. The encoding and/or transcoding may be into or according to one or more codecs and at a variety of frame or other rates.

At block 620, samples from the transcoded output of block 615 may be selected. For example, the samples may comprise 30 frames per second of video and/or 7 chunks per second of audio, which may be a subset of the transcoded data of block 615. The samples and the encoded and/or transcoded data of block 615 and/or a hash or fingerprint thereof may be saved in, for example, Sample 385 record or the like. Samples, hashes, or fingerprints may be referred to herein as a "representation".

At block 625, Ad Harvester 600 may receive a program schedule for Call Sign 340 in the TV Distribution Medium 180. The program schedule may be received from, for example, 3$^{rd}$ Party Computer 150. The program schedule may be stored in, for example, Program Schedule 345 record.

At block 630, Ad Harvester 600 may identify the then-current show in the Program Schedule 345 for Call Sign 340 at the then-current time. The show may be recorded in, for example, Show ID 350 record.

Blocks 635 to 685 iterate for each Show ID 350 record of block 630. Blocks 640 to 680 iterate for each Sample 385 of block 620. The processing of blocks 640 to 680 may be in relation to video and/or audio samples in Sample 385 records.

At block 645 a determination may be made whether the then-current Sample 385 or a hash thereof matches a Sample

385 of or a hash thereof associated with an existing SPT Ad ID 320. If not, then at block 1100, a determination may be made regarding whether the Sample 385 meets criteria for being an advertisement. This determination is discussed further in relation to FIG. 11.

If affirmative at block 1100, then at block 655 the start and stop of the advertisement may be determined. The start and stop of the advertisement may be determined according to for example, characteristic lengths of advertisements in the TV Distribution Medium and Call Sign, when a scene change occurred in Samples 385 preceding the current Sample 385, when a blank or black frame occurred in Samples 385 preceding the current Sample 385, when a change in volume occurred relative to Samples 385 preceding the current Sample 385, relative to the passage of time as may have been evaluated at block 1155, relative to other advertisements as may have been evaluated at block 1165, the length of other instances of known and unknown content in which the Sample 385 occurs, and according to other criteria, including those evaluated in New Ad Identifier 1100.

At block 655 the Samples 385, such as the present Sample 385, and/or a hash, fingerprint, or representation for the advertisement may also be stored or may be labeled to be stored after all Samples 385 in the advertisement have been processed.

At block 660, the advertiser in the advertisement may be identified, such as through identification of products, logos, trademarks, text, images, and the like which are associated with a known advertiser. The identified advertiser may be stored in, for example, an Advertiser 390 record.

At block 665, the advertisement may be assigned an SPT Ad ID 320 and, at block 670, which may follow block 645 if affirmative at block 645, data regarding the occurrence of the advertisement may be recorded, such as in or in association with SPT Ad ID 320, which data may comprise information such as a timestamp or timestamps for the advertisement (such as timestamps for different time zones), the SPT Ad ID and the Show ID in which the advertisement occurred, the Pod number, commercial break number, or Ad Slot within the show (which may be recorded as Pod 355 and/or as Ad Slot 395), the market in which the ad was shown (such as a DMA 365), the Operator 160 and TV Distribution Media 180 of the show and advertisement, a confidence score which may have been generated in block 1100 to determine whether the Sample 385 is an advertisement or which may have been used in block 645 to determine that the Sample 385 was a match with an existing SPT Ad ID 320, the type of advertisement or the Ad Slot in which the advertisement appeared (as may be determined by, for example, Ad Insertion Type Determiner 1000), the estimated spending by the Advertiser 390 on the advertisement ("Estimated Spend"), a hash or representation of the Sample, and the like. The Estimated Spend may be determined according to, for example, a process such as that outlined in U.S. application Ser. No. 14/276,920, filed May 13, 2014.

At block 675, which may follow block 1100 if 1100 is not affirmative, the Sample 385 may be identified as not being an advertisement and may be identified as a sample of a TV show, such as of Show ID 350 record of block 630 or otherwise according to Program Schedule 345, Call Sign 340 and the then-current time. If not already performed, Show ID 350 may be assigned to the Sample 385 and the Sample 385 may be stored and/or hashed or fingerprinted and stored (which may be referred to herein as a "representation"). Information regarding the Sample 385 may also be stored, such as the time from the start of the show, a name of the show, the market (such as a DMA), the Operator, to TV Distribution Media, and the like.

Following recordation of data regarding the advertisement or following block 675, Ad Harvester 600 may return to iterate over the next Sample 385, Show, Call Sign, and TV Distribution Medium.

At block 699, Ad Harvester 600 may conclude or return to a process which spawned Ad Harvester 600.

Figure 7:
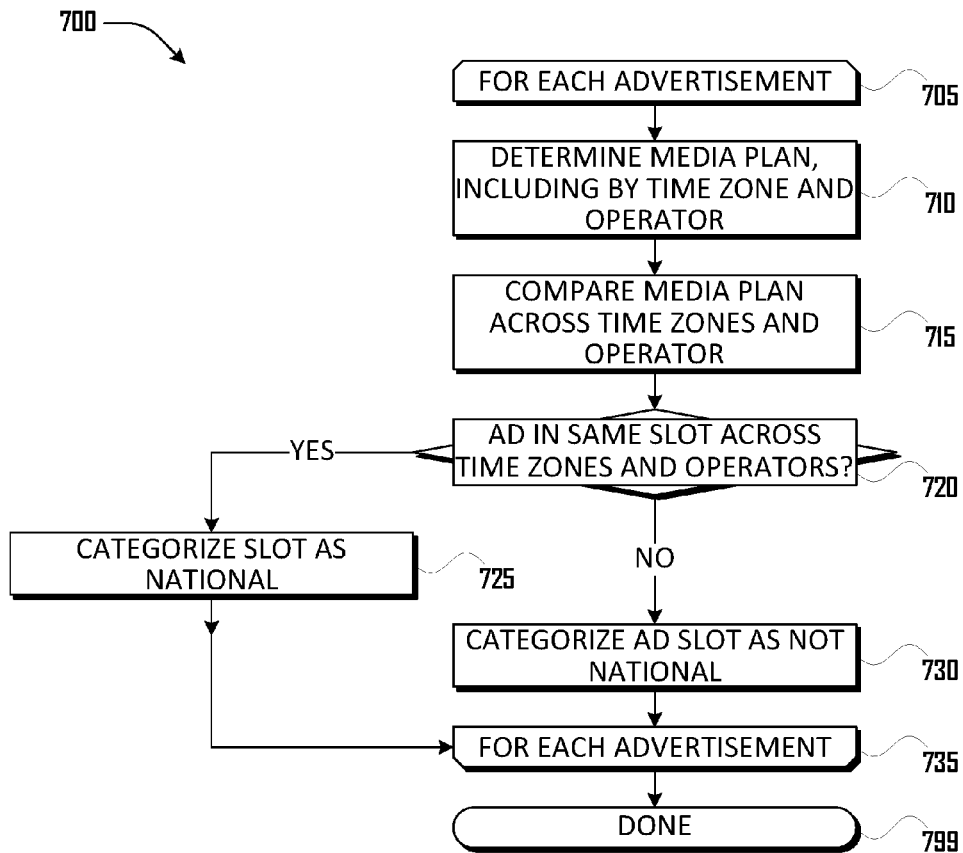
FIG. 7 is a flowchart illustrating an exemplary embodiment of a Media Plan Determiner routine.

FIG. 7 is a flowchart illustrating an exemplary embodiment of a Media Plan Determiner 700 routine. Media Plan Determiner 700 may be executed by, for example, SPT Server 200. Media Plan Determiner 700 may be executed to determine the media plan for an advertisement. A media plan for an advertisement is a record of which shows an advertisement appeared in, on what days and at what times, in what Pods and Ad Slots, on what TV Distribution Media, in what markets, and the like. Advertisements are often placed by marketing companies with only general guidance from the underlying advertiser; multiple parties may be involved in selecting which advertisements appear when and where. As a result, the media plan for advertisements is seldom known in advance and precise media plans developed after the fact—prior to the disclosure herein—may be expensive to compile and may be based on sampling and extrapolations, which can be prone to error.

Block 705 to 735 iterate for each advertisement assigned an SPT Ad ID 320 and with respect to which ad occurrence data was recorded, such as in block 670 of Ad Harvester 600.

At block 710, the ad occurrence data, such as of block 670 of Ad Harvester 600, and the show information, such as of block 675 of Ad Harvester, may be compiled or tabulated to determine a media plan for then then-current SPT Ad ID 320. The media plan may be stored as, for example, Media Plan 315. A sample Media Plan 315 may contain columns such as, for example, Brand, Brand ID, Ad Title, SPT Ad ID, Call Sign, Show Name, Show Episode, Show Type, Show Genre, Show Sub Genre, New Episode, Air Time Pacific/Central/Mountain/Eastern, Day of Week, Day Part, Pod and/or Slot Identifier, Airing Type (national, national satellite, regional, etc.), Market (DMA), Platform (TV Distribution Media), Operator, Duration, Parent SPT Ad ID, Sample Hash ID, Industry, Sub Industry, Product Categories, Products, Estimated Spend, and the like.

At block 715, the Media Plan 315 across time zones and across Operators 160 may be compared. This may be by comparison of Media Plans 315 specific to each or within one Media Plan 315 which spans time zones and Operators 160.

At block 720, a determination may be made regarding whether for the same show, such as by Show ID 350, whether the same SPT Ad ID 320 appears in the same Ad Slot 395 within Show ID 350. If affirmative at block 720, then Ad Slot 395 for Show ID 350 may be categorized as a "national" Ad Slot 395 and the SPT Ad ID 320 may be categorized as a "national" ad. National Ad Slots are Ad Slots which are controlled by a party with national reach, such as TV Network 185, and national Advertisements are advertisements which are placed in national Ad Slots.

If negative at block 720, then at block 730 Ad Slot 395 for Show ID 350 may be categorized as a "not national" Ad Slot or as a "regional/local/dynamic" Ad Slot. Regional Ad Slots are Ad Slots which are sold or allocated to regional operators or advertising agencies to fill. Regional Ad Slots may be further categorized as "local" Ad Slots if different advertisements are found in the same Ad Slot within a region. Dynamic Ad Slots are regional or local Ad Slots which are filled dynamically by, for example, Operator 160 or an affiliate, and may be dynamically addressed to individual households or areas.

At block 735 Media Plan Determiner 700 may return to iterate over the next SPT Ad ID 320.

At block 799, Media Plan Determiner 700 may conclude or return to a process which spawned Media Plan Determiner 700.

Figure 8:
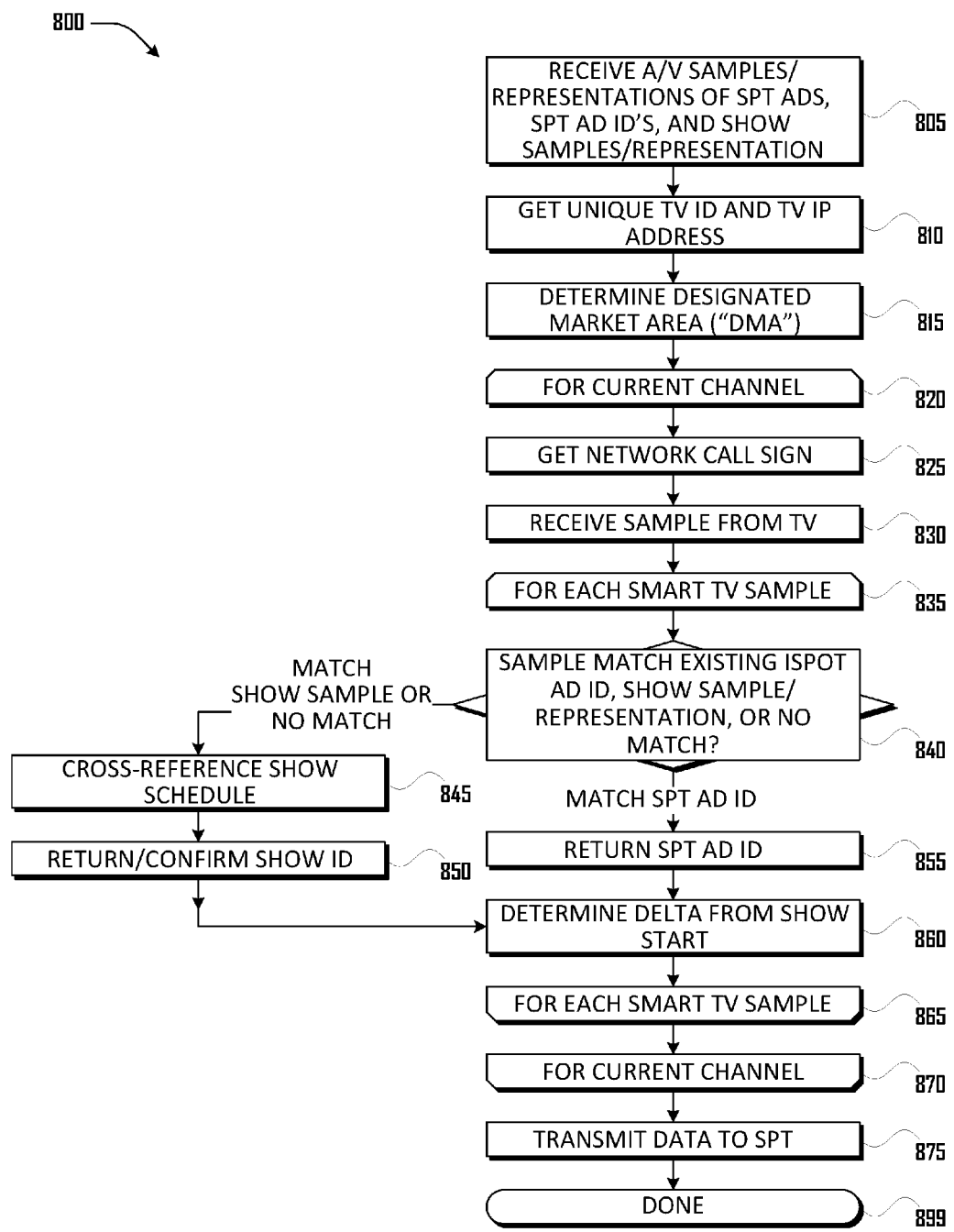
FIG. 8 is a flowchart illustrating an exemplary embodiment of a Viewing Data Collector routine.

FIG. 8 is a flowchart illustrating an exemplary embodiment of a Viewing Data Collector 800 routine. Viewing Data Collector 800 may be executed by, for example, Smart TV 400. Viewing Data Collector 800 may be loaded in Smart TV 400 by, for example, a manufacturer or distributor of Smart TV 400 or by a party otherwise entitled to install software on Smart TV 400.

At block 805, Viewing Data Collector 800 may receive audio and/or video samples or hashes or fingerprints or another representation of advertisements which have been assigned an SPT Ad ID 320, the corresponding SPT Ad IDs 320, samples, hashes, or fingerprints or another representation of shows, and corresponding Show IDs 350. The audio and/or video samples, hashes, fingerprints, or representation of both advertisements and shows may be stored in Smart TV Datastore 500 as SPT Sample 505; SPT Ad IDs 320 may be stored in Smart TV Datastore 500 as SPT Ad IDs 510; Show IDs 350 may be stored in Smart TV Datastore 500 as Show IDs 515. The samples may be or comprise hashes or fingerprints of samples, which may be referred to herein as "representations".

At block 810, Viewing Data Collector 800 may obtain a unique TV identifier of the Smart TV 400, such as a MAC address or the like, and an IP Address utilized by the Smart TV 400. This data may be saved in or in association with, for example, a Smart TV Data 520 record.

At block 815, Viewing Data Collector 800 may obtain the Designated Market Area ("DMA") in which the Smart TV 400 is present. This may be obtained from a third party, such as $3^{rd}$ party Computer 150, who may map the IP address of Smart TV 400 to a DMA and may provide this information to Viewing Data Collector 800, such as in response to a request for the same made by Viewing Data Collector 800.

Blocks 820 to 870 may iterate for the then-current channel or Call Sign being received and rendered by Smart TV 400.

At block 825, Viewing Data Collector 800 may obtain the Call Sign of the TV Network 185 of the then-current channel. This may be obtained from the transmission over TV Distribution Media 180.

At block 830 a sample of content rendered by Smart TV 400 may be obtained from Smart TV 400 by Viewing Data Collector 800. The sample may be, for example, 1 frame-per-second of video. This sample, hash, fingerprint, or representation thereof may be saved as, for example, Smart TV Sample 530.

Blocks 835 to 865 may iterate for each Smart TV Sample 530.

At block 840, a determination may be made regarding whether Smart TV Sample 530 matches an existing SPT Ad ID, a Show ID 515, or whether no match is obtained. This determination may involve a comparison of Smart TV Sample 530 to SPT Sample 505, which SPT Samples may be associated with a corresponding SPT Ad IDs 510 and Show IDs 515. The comparison may be made by, for example, an Automated Content Recognition ("ACR") algorithm executed by Smart TV 400 or by Viewing Data Collector 800, which ACR system (or the like) may use the Smart TV Sample 530 as a reference.

If at block 840 the match was to a Show ID 515 or if there was no match, then at block 845, the matched Show ID 515 may be cross-referenced with Show Schedule 525 to confirm the match or to identify Show ID 515 if no match was determined. Show Schedule 525 may be obtained from a transmission over TV Distribution Media 180 and/or may obtained from or provided by $3^{rd}$ Party Computer 150 or another party as a service. At block 850, the Show ID 515 may be returned.

If at block 840 the match was to an SPT Ad ID 510, then at block 855 the matching SPT Ad ID 510 may be returned.

At block 860, the amount of time since the start of the show may be determined, such as relative to Show Schedule 525.

At block 865, Viewing Data Collector 800 may return to iterate over the next Smart TV Sample 530, if any.

At block 870, Viewing Data Collector 800 may return to block 820 iterate over the next channel, if any.

At block 875, the information collected by Viewing Data Collector 800 may be transmitted to SPT Server 200 as, for example, Smart TV Data 520 records, Show ID 515 records, and SPT Ad ID 510 records. This information may further identify which SPT Samples 505 were found, as well as a confidence score relating to block 840 to 860.

At block 899, Viewing Data Collector 800 may conclude or return to a process which spawned Viewing Data Collector 800.

Figure 9:
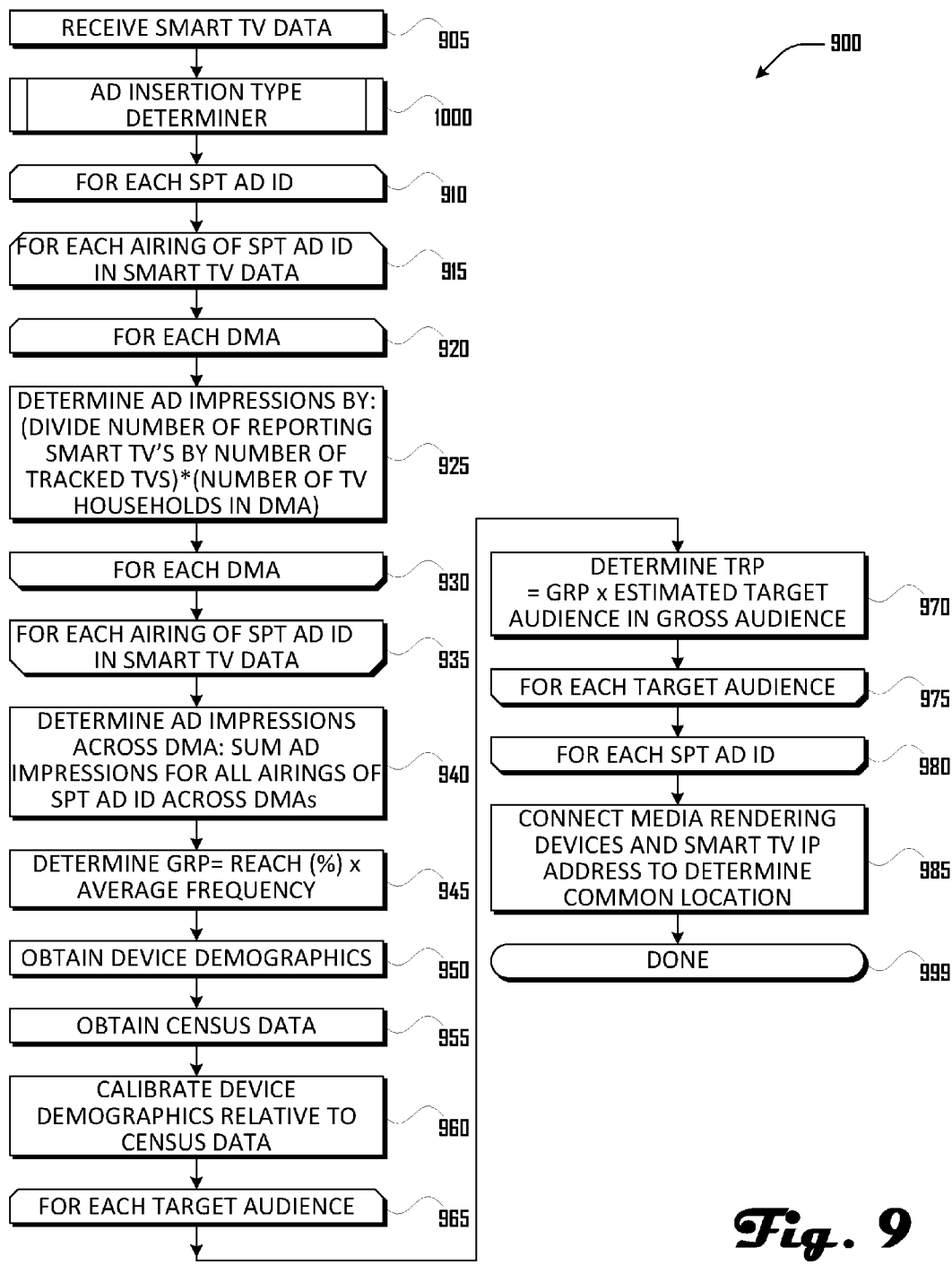
FIG. 9 is a flowchart illustrating an exemplary embodiment of a Smart TV Data Collector routine.

FIG. 9 is a flowchart illustrating an exemplary embodiment of a Smart TV Data Collector 900 routine. Smart TV Data Collector 900 may be executed by, for example, SPT Server 200.

At block 905, Smart TV Data Collector 900 may receive Smart TV Data 520, such as from Smart TV 400 and Viewing Data Collector 800.

At block 1000, Smart TV Data Collector 900 may execute Ad Insertion Type Determiner 1000, though Ad Insertion Type Determiner 1000 may be executed as an independent process, not as a subroutine. Ad Insertion Type Determiner 1000 is discussed in relation to FIGS. 10A and 10B.

Blocks 910 to 980 iterate for each SPT Ad ID in the Smart TV Data 520 of block 905. Blocks 915 to 935 iterate for each airing of SPT AD ID in the Smart TV Data 520 of block 905. Blocks 920 to 930 iterate for each DMA in which occurred airings of SPT AD ID.

At block 925, the number of impressions for each SPT Ad ID 510 in or associated with the Smart TV Data 520 in the DMA may be determined by dividing the number of reporting Smart TVs 400 in the Smart TV Data 520 of block 905 by the number of tracked TVs (which may be either i) Smart TVs 400 which could potentially report or ii) all TVs) and multiplying the product of the foregoing by the number of television households in the DMA.

Block 930 may return to block 920 to iterate over the next DMA. Block 935 may return to block 915 to iterate over the next airing of SPT Ad ID in Smart TV Data.

At block 940, Smart TV Data Collector 900 may determine the total advertisement impressions across geo-political units by summing, for example, the ad impressions by DMA determined in block 925. This will determine the advertisement impressions for "national" advertisements (those placed in national Ad Slots 395) as well as "regional" advertisements (advertisements placed in regional Ad Slots 395—the national/regional categorization having been made by, for example, Media Plan Determiner 700).

At block 945, the Gross Rating Points ("GRP") may determined as the reach of an SPT Ad ID (expressed as a percentage of the total population) multiplied by the frequency or average frequency of the occurrence of the advertisement associated with the iSport Ad ID. The GRP may be saved as, for example, GRP 330 records.

At block 950, Smart TV Data Collector 900 may obtain demographics for the Smart TVs 400 providing data at block 905. At block 955, Smart TV Data Collector 900 may obtain census data relative to the population possessing Smart TVs 400 which provided data at block 905.

At block 960, Smart TV Data Collector 900 may calibrate the device demographics of block 950 relative to the census data of block 955.

Blocks 965 to 975 iterate for each target audience in the total population, such as an age range, a geographic area, a gender, and the like, in the total population.

At block 970, Smart TV Data Collector 900 may determine the Target Rating Points ("TRP") by multiplying the GRP of block 935 by the estimated percentage of the target audience in the gross audience (or total population). The TRP may be saved as, for example, TRP 335 records.

Block 975 may return to block 965 to iterate over the next target audience, if any.

Block 980 may return to block 910 to iterate over the next SPT Ad ID.

At block 985, Smart TV Data Collector 900 may connect Media Rendering Devices 120 to Smart TVs 400, such as according to IP Address or other information, to determine Media Rendering Devices 120 and Smart TVs 400 which occupy a common location, so that data from one can be ascribed to the other.

At block 999, Smart TV Data Collector 900 may conclude or return to a process which spawned it.

Figure 10A:
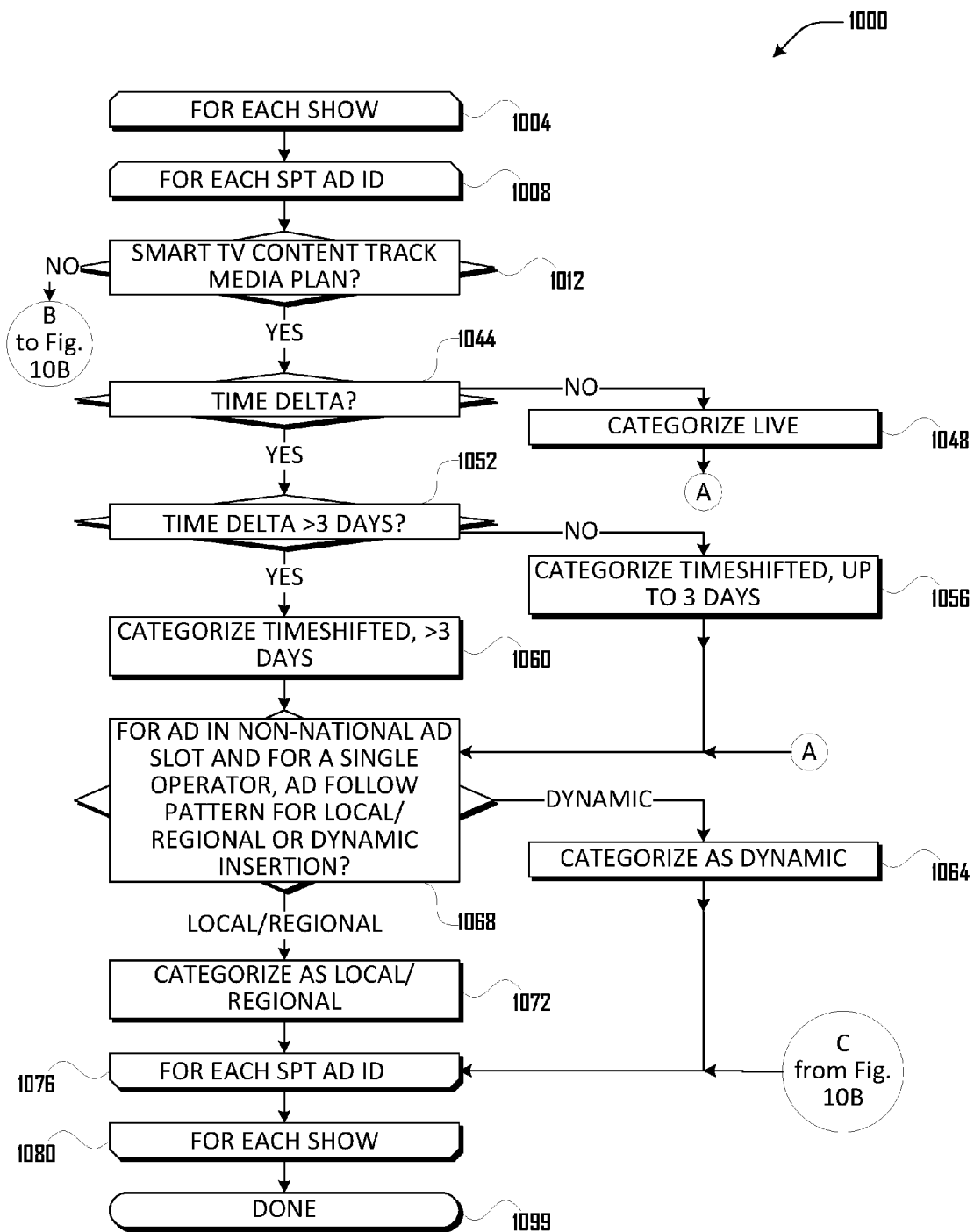
FIGS. 10A and 10B are a flowchart illustrating an exemplary embodiment of an Ad Insertion Type Determiner routine.
Figure 10B:
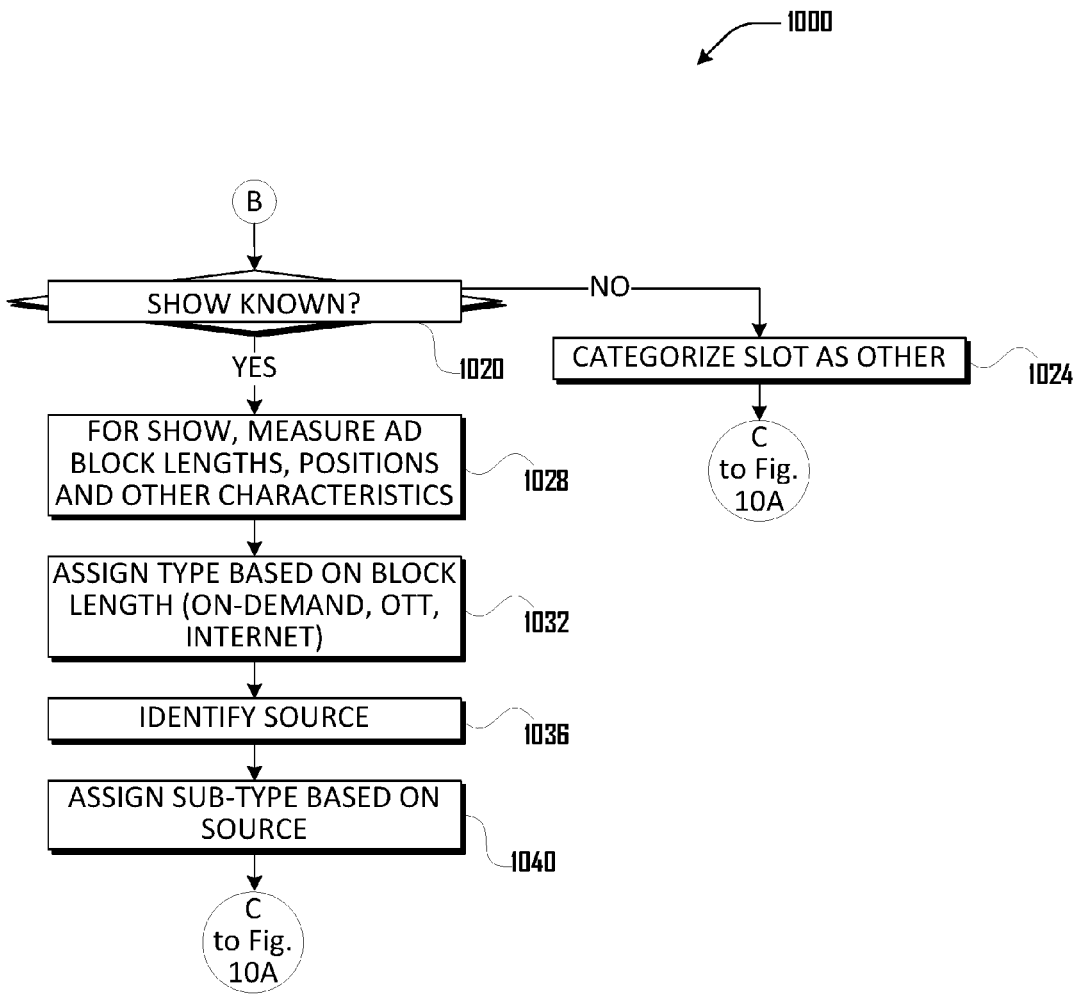

FIGS. 10A and 10B are a flowchart illustrating an exemplary embodiment of an Ad Insertion Type Determiner 1000 routine. Ad Insertion Type Determiner 1000 may be executed by SPT Server 200 within Smart TV Data Collector 900 as a subroutine or as an independent process. Ad Insertion Type Determiner 1000 determines a type of advertisement insertion for advertisements which have been given an SPT Ad ID 320, relative to the advertisement and/or an Ad Slot into which an advertisement may be inserted.

Blocks 1004 to 1080 iterate for each show, such as by Show ID 350, in the Smart TV Data 380 received at, for example, block 905 in Smart TV Data Collector 900. Blocks 1008 to 1076 iterate for each SPT Ad ID received at, for example, block 905 in Smart TV Data Collector 900.

At block 1012, a determination may be made regarding whether the Smart TV content and the then-current SPT Ad ID tracks the Media Plan 315 determined by Media Plan Determiner 700.

If affirmative at block 1012, then at block 1044, a determination may be made regarding whether there is a time difference between the Smart TV content and the Media Plan 315, such as according to a timestamp. If negative at block 1044, then at block 1048 the SPT Ad ID in the Show may be categorized as "live", meaning that it was rendered by the reporting Smart TV 400 in real time. If affirmative at block 1044, then at block 1052 a determination may be made regarding whether the time difference is greater than three days. If negative at block 1052, then at block 1056, the SPT Ad ID in the Show may be categorized as "timeshifted, up to three days." If affirmative at block 1052, then at block 1060, then SPT Ad ID in Show may be categorized as "timeshifted, greater than three days."

At block 1068, a determination may be made, for advertisements in a non-national Ad Slot and for a single Operator, regarding whether or not the advertisement insertion follows a pattern for local, regional, or dynamic advertisement insertion. For example, a single Operator may show the same advertisement across a region, such as across an MTA (in which case the advertisement and/or Ad Slot may be categorized as "regional"), or may show different advertisements within a region (in which case the advertisement and/or Ad Slot may be categorized as "local"), or may show different advertisements to many different viewers without regard to geographic proximity (in which case the advertisement and/or Ad Slot may be categorized as "dynamic"). Depending on the determination at block 1068, the advertisement and/or Ad Slot and/or advertisement insertion type may be categorized as "locally" or "regionally inserted", such as at block 1072, or the advertisement and/or Ad Slot may be categorized as "dynamically inserted", such as at block 1064.

If negative at block 1012, then, in FIG. 10B at block 1020 a determination may be made regarding whether the Show in which the Ad ID occurred is known. If negative at block 1020, then at block 1024, the Ad Slot in which the SPT Ad ID occurred may be categorized as "other".

If affirmative at block 1020, then at block 1028, for the Show in which the SPT Ad ID occurred, the lengths of blocks of advertisements in the Show, the position of advertisements in the Show, and other characteristics may be measured. Different TV Distribution Media may have different lengths of blocks of advertisements in Shows, positions of advertisements in Shows, and other characteristics. At block 1032, the TV Distribution Media of the Show and Advertisement may be assigned as a type, such as on-demand, OTT, or Internet. At block 1036, the source may be identified, such as according to information in the Smart TV Data received, for example, at block 905. The source may a subset of or a particular provider within the type identified at block 1032, such as an Operator (such as Comcast, Timewarner, DirecTV, and the like) or an OTT provider (such as Amazon, Hulu, Netflix, and the like), or an Internet provider (such as YouTube). At block 1040, the source identified at block 1036 may be assigned as a sub-type. At circle "C", FIG. 10B may return to block 1076.

At block 1076, Ad Insertion Type Determiner 1000 may return to block 1008 to iterate over the next SPT Ad ID. At block 1080, Ad Insertion Type Determiner 1000 may return to block 1004 to iterate over the next Show.

At block 1099, Ad Insertion Type Determiner 1000 may conclude or may return to a process which spawned it.

Figure 11A:
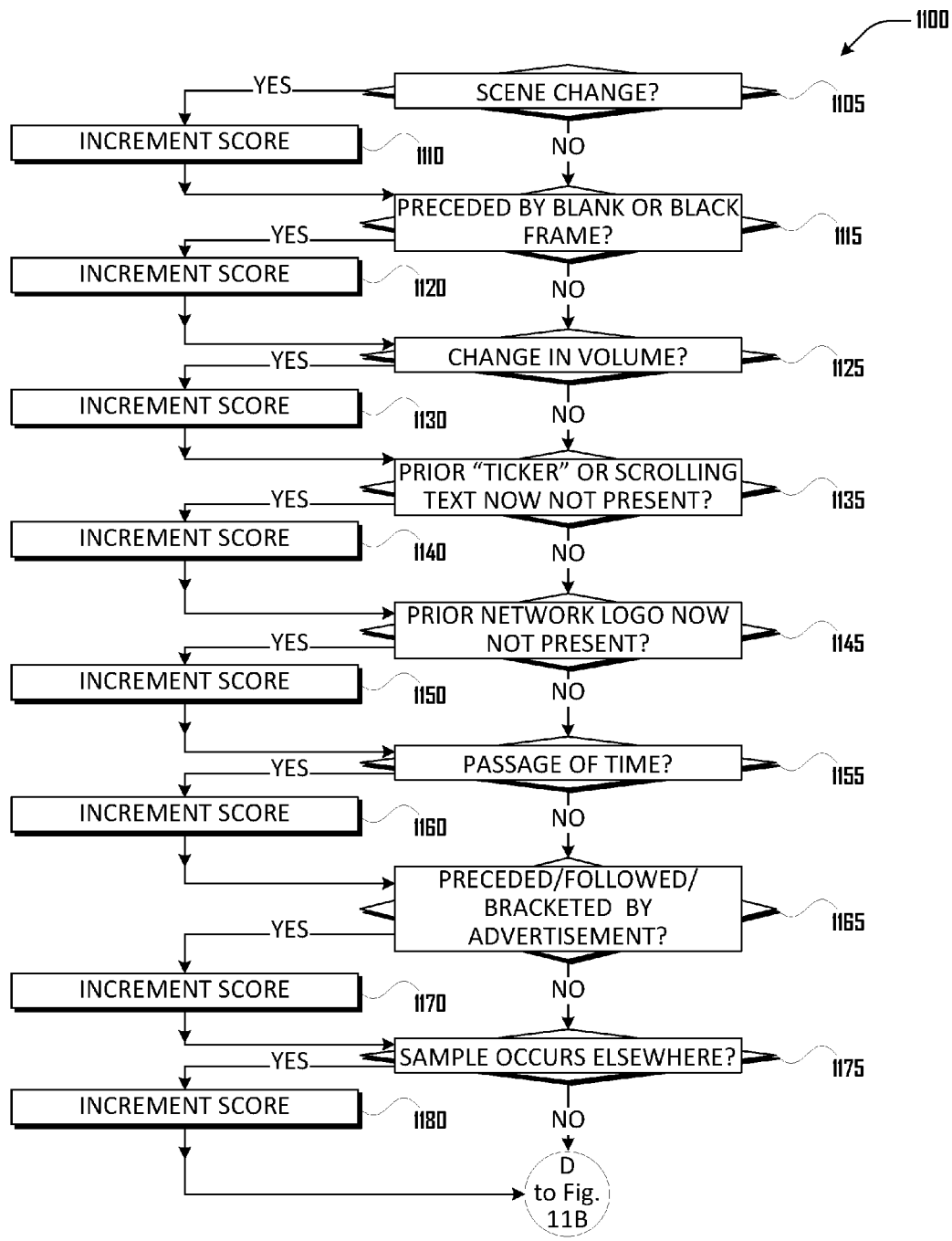
FIGS. 11A and 11B are a flowchart illustrating an exemplary embodiment of a New Ad Identifier routine.
Figure 11B:
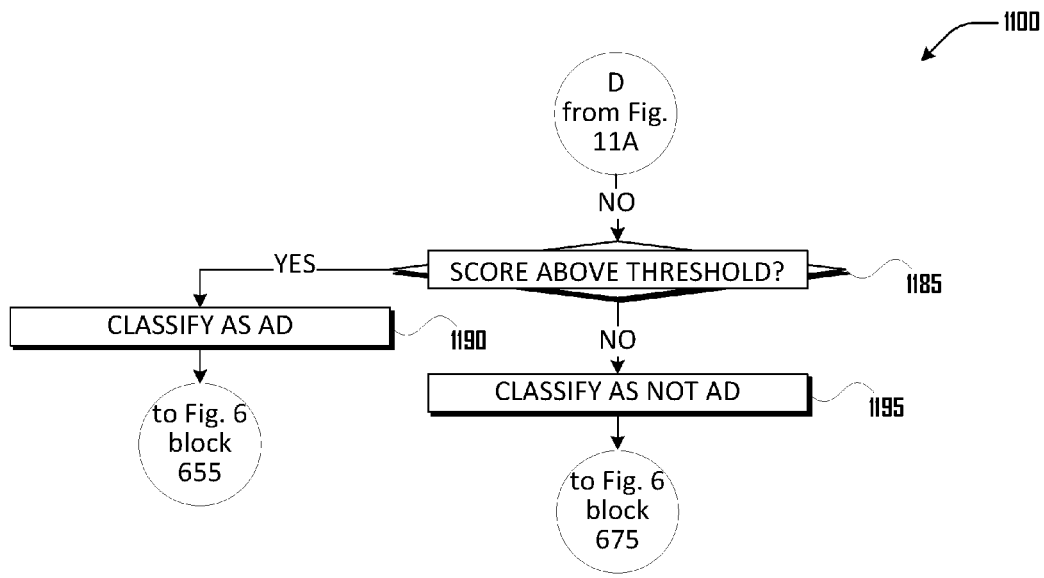

FIG. 11 is a flowchart illustrating an exemplary embodiment of a New Ad Identifier 1100 routine. New Ad Identifier 1100 determines whether a Sample 385 which does not match an existing SPT Ad ID 320 is an advertisement. New Ad Identifier 1100 may apply criteria for making this determination. New Ad Identifier 1100 may utilize a scoring system which applies a score (or scores) to various criteria and may then determine that Sample 385 is an advertisement if the total score is above a threshold; equivalent systems for evaluating a list of criteria may be utilized. A list of examples of criteria for being an advertisement are listed in FIGS. 11A and 11B. A different set of criteria may be utilized and the criteria may be utilized in a different order. Evaluation of the criteria may be terminated upon the occurrence of an event or a dispositive criteria.

For example, at block 1105 a determination may be made regarding whether the Sample 385 represents a scene change relative to a chronologically preceding Sample 385. The scene change evaluation may be based on a change in the video data. This evaluation may be performed by evaluating encoding of frames. For example, a Sample 385 which uses a preceding frame as a reference for motion-vector based compression may not be considered a scene change. This evaluation may also utilize a histogram of pixels in Sample 385 and a preceding Sample 385. An "earth mover distance" or other similar algorithm may also be utilized. If affirmative, then at block 1110, the advertisement score for Sample 385 may be incremented.

For example, at block 1115 a determination may be made regarding whether Sample 385 is preceded by a blank or black frame. If affirmative, then at block 1120, the advertisement score for Sample 385 may be incremented.

For example, at block 1125 a determination may be made regarding whether there is a change of volume in the Sample 385 relative to a preceded Sample. If affirmative, then at block 1130, the advertisement score for Sample 385 may be incremented.

For example, at block 1135 a determination may be made regarding whether a "ticker" or scrolling text in a preceding Sample 385 is not present in the then-current Sample 385. If affirmative, then at block 1140, the advertisement score for Sample 385 may be incremented.

For example, at block 1145 a determination may be made regarding whether a "ticker" or scrolling text in a preceding Sample 385 is not present in the then-current Sample 385. If affirmative, then at block 1140, the advertisement score for Sample 385 may be incremented.

For example, at block 1155 a determination may be made regarding whether an amount of time has elapsed during the current Show, since the start of the current Show, or since the last advertisement in the current Show, which amount of time is associated with an advertisement. If affirmative, then at block 1160, the advertisement score for Sample 385 may be incremented.

For example, at block 1165 a determination may be made regarding whether the current Sample 385, or a time range of Samples around current Sample 385, is preceded, followed by, or bracketed by (on both sides) by a Sample which matches an existing SPT Ad ID 320. If affirmative, then at block 1170, the advertisement score for Sample 385 may be incremented.

For example, at block 1175 a determination may be made regarding whether the current Sample 385 occurs elsewhere, such as in other broadcasts by other Call Signs 340 or on other Channels 310, or on other Networks 305. If affirmative, then at block 1180, the advertisement score for Sample 385 may be incremented.

At block 1185 a determination may be made regarding whether the total score for the current Sample 385 is above a threshold. If it is, then at block 1190 the current Sample 385 may be classified as an advertisement and New Ad Identifier 1100 routine may, for example, return to block 655 of FIG. 6. If it is not, then at block 1195 the current Sample 385 may be classified as other than an advertisement and New Ad Identifier 1100 routine may, for example, return to block 675 of FIG. 6. New Ad Identifier 1100 routine may also provide that scores close to but not over the threshold may be evaluated by a human.

The above Detailed Description of embodiments is not intended to be exhaustive or to limit the disclosure to the precise form disclosed above. While specific embodiments of, and examples are described above for illustrative purposes, various equivalent modifications are possible within the scope of the system, as those skilled in the art will recognize. For example, while processes or blocks are presented in a given order, alternative embodiments may perform routines having operations, or employ systems having blocks, in a different order, and some processes or blocks may be deleted, moved, added, subdivided, combined, and/or modified. While processes or blocks are at times shown as being performed in series, these processes or blocks may instead be performed in parallel, or may be performed at different times.

Further, any specific numbers noted herein are only examples; alternative implementations may employ differing values or ranges.

The invention claimed is:

1. A method of measuring an audience for advertisements executed on a computer comprising a memory, which method comprises:
   determining a media plan for a first advertisement;
   receiving a set of viewing data from and related to a set of smart TVs, the set of viewing data comprising smart TV identifiers and, with respect to content rendered by the smart TVs, show identifiers, and advertisement identifiers;
   categorizing whether the content rendered by the smart TVs was at least one of live, timeshifted, on-demand, and over-the-top;
   categorizing insertion instances of the first advertisement in the content rendered by the smart TVs as being at least one of national, regional, and dynamic;
   for the first advertisement, determining ad impression volume according to the media plan, the set of viewing data, and the categorizations;
   wherein determining ad impression volume comprises dividing by a number of reporting smart TVs by a number of tracked TVs and multiplying by a result thereof by a number of television households in a designated market area; and
   wherein the ad impression volume is summed across all designated market areas in a geographic or political unit to determine the ad impression volume for the geographic or political unit.

2. The method according to claim 1, further comprising comparing the media plan for each advertisement across at least two time zones and at least two TV distribution media and, if the advertisement occurs at by a same temporal location in the same show across the time zones and TV distribution media, then categorizing the temporal location in a same show as a national advertisement slot and, if the advertisement does not occur at the same temporal location in the same show across the time zones and operators, then categorizing the temporal location in the same show as a non-national advertisement slot.

3. The method according to claim 1, when the temporal location is categorized as a non-national time slot, further comprising determining that the advertisement was either inserted uniformly or heterogeneously across a geographic area by an operator of a TV distribution media in the geographic area.

4. The method according to claim 1, wherein determining the media plan for the first advertisement comprises:
   for more than one network call sign in more than one TV distribution medium, analyzing content associated with each network call sign to identify new as well as previously identified advertisements in the content and to extract representations of identified advertisements;
   assigning advertisement identifiers to advertisements in the content; accessing program schedules for the network call signs, which program schedules comprise start and end times of shows transmitted by the call signs in the content;
   determining a number of times and the time when the advertisement identifiers occurred in the shows in the content; and
   determining the media plan as comprising a subset of shows in which the first advertisement occurred in the program schedule.

5. The method according to claim 4,
wherein analyzing content associated with each network call sign to identify new advertisements in the content comprises determining if a portion of the content comprises at least one of a scene change relative to a preceding portion, if the portion of the content is preceded by a blank or black portion, if the portion of the content has a change in volume relative to a preceding portion, if the portion of the content no longer has an area of scrolling text which was present in a preceding portion, if the portion of the content no longer has a network logo which was present in a preceding portion, if a characteristic amount of time has passed since the beginning of a show in which the portion of the content occurs or since a previous advertisement in the show in which the portion of the content occurs, if an advertisement occurs before, after, or before and after the portion of the content, and whether the portion of the content occurs in multiple instances in the content associated with each network call sign.

6. The method according to claim 4, wherein analyzing content associated with each network call sign to identify new as well as previously identified advertisements in the content comprises determining if the content matches an already identified advertisement or if the content meets criteria for an advertisement and, if the content is determined to match an already identified advertisement or meets criteria for being an advertisement, then recording data regarding the content, which data comprises at least one of the advertisement identifier, the time when the content was rendered, the start and end time of the advertisement, a representation of the advertisement, a market area within which the smart TV which rendered the advertisement was present, an operator who transmitted the content, an ad slot in which the advertisement occurred, and an estimated amount of spending on the advertisement.

7. The method according to claim 1, further comprising transmitting to smart TVs representations of advertisement content and the advertisement identifiers, representations of show content and show identifiers, and receiving from the smart TVs information relating to the identification by the smart TVs of advertisements in content streams rendered by the smart TVs, which information comprises a subset of the advertisement identifiers and show identifiers sent to the smart TVs; and
categorizing the content rendered by the smart TVs, wherein the content rendered by the smart TVs is categorized as live when it tracks a media plan without a time shifting.

8. The method of claim 1,
transmitting to smart TVs representations of advertisement content and the advertisement identifiers, representations of show content and show identifiers, and receiving from the smart TVs information relating to the identification by the smart TVs of advertisements in content streams rendered by the smart TVs, which information comprises a subset of the advertisement identifiers and show identifiers sent to the smart TVs; and
categorizing the content rendered by the smart TVs, wherein the content rendered by the smart TVs is categorized as time shifted when it tracks a media plan with a time shifting.

9. The method of claim 1, further comprising transmitting to smart TVs representations of advertisement content and the advertisement identifiers, representations of show content and show identifiers, and receiving from the smart TVs information relating to the identification by the smart TVs of advertisements in content streams rendered by the smart TVs, which information comprises a subset of the advertisement identifiers and show identifiers sent to the smart TVs; and
categorizing a source of the content rendered by the smart TVs by determining that the content does not track a media plan, but that a show in the content is known, and measuring characteristics of the advertisements in the content, and assigning source of the content according to the measured characteristics.

10. The method according to claim 9, wherein the source comprises an on-demand, over-the-top, or Internet transmission to the smart TV.

11. The method according to claim 9, wherein measuring characteristics of the advertisements in the content comprises measuring a block length for blocks of advertisements in the content.

12. The method according to claim 1, further comprising accessing a smart TV demographics and a census data and calibrating the smart TV demographics relative to the census data.

13. The method according to claim 1, further comprising determining a gross rating point for the first advertisement.

14. The method according to claim 13, further comprising determining a target rating point for a target audience for the first advertisement.

15. The method according to claim 1, wherein the set of viewing data further comprises a designated market area, an IP address for a smart TV in the set of smart TVs, a timestamp for an initial receipt of the first advertisement, a timestamp for a concluding receipt of the first advertisement, a network call sign, and a show schedule ID.

16. A method of measuring an audience for advertisements executed on a computer comprising a memory, which method comprises:
determining a media plan for a first advertisement;
receiving a set of viewing data from and related to a set of smart TVs, the set of viewing data comprising smart TV identifiers and, with respect to content rendered by the smart TVs, show identifiers, and advertisement identifiers;
categorizing whether the content rendered by the smart TVs was at least one of live, timeshifted, on-demand, and over-the-top;
categorizing insertion instances of the first advertisement in the content rendered by the smart TVs as being at least one of national, regional, and dynamic;
for the first advertisement, determining ad impression volume according to the media plan, the set of viewing data, and the categorizations;
receiving IP addresses of media rendering devices and smart TVs and associating the media rendering devices and the smart TVs based at least in part on the received IP addresses; and
wherein determining ad impression volume comprises dividing the number of reporting smart TVs by a number of tracked TVs and multiplying the result thereof by a number of television households in a designated market area.

* * * * *